United States Patent [19]

Makishima

[11] Patent Number: 5,014,743
[45] Date of Patent: May 14, 1991

[54] DOUBLE-PIPE PIPE COUPLING
[75] Inventor: Reichi Makishima, Tokyo, Japan
[73] Assignee: Nitto Kohki Co., Ltd., Tokyo, Japan
[21] Appl. No.: 559,324
[22] Filed: Jul. 30, 1990
[30] Foreign Application Priority Data Aug. 3, 1989 [JP] Japan .................. 1-90998[U]

[51] Int. Cl.$^5$ .................. F16L 29/04; F16L 39/00
[52] U.S. Cl. .................. 137/614.03; 137/614.05
[58] Field of Search .................. 137/614.02, 614.04, 137/614.05, 614.06, 614, 614.03

[56] References Cited

U.S. PATENT DOCUMENTS 4,347,870 9/1982 Maldavas .................. 137/614.05
4,671,540 6/1987 Medvick et al. .................. 285/87

Primary Examiner—Martin P. Schwadron
Assistant Examiner—Kevin L. Lee
Attorney, Agent, or Firm—Nixon & Vanderhye

[57] ABSTRACT

A double-pipe pipe coupling comprises a socket provided with a socket main cylinder having a front end portion on which taper holes are formed, locking balls housed in the taper holes and a sleeve on the outer periphery of the front end portion of the socket main cylinder. The plug is provided with a plug main cylinder on which an annular groove is formed. The socket has a cylindrical slide ring and a collar cylinder arranged coaxial to each other, and first and second passages and defined by the side ring and the collar cylinder. The slide ring includes a stopper for stopping the sliding of the slide ring in the axial direction of the socket main cylinder at a certain position and locking the movement of the sleeve when the slide ring advances and a valve member serving to seal the front end of the plug when the plug is connected into the socket. The plug includes a plug main cylinder, a partition wall formed integral with the plug main cylinder and located inside the plug main cylinder and at a position which corresponds to the collar cylinder of the socket, and first and second passages and which are partitioned by the partition wall. First and second slide valves are arranged in the first and the second passage.

6 Claims, 3 Drawing Sheets

5,014,743

DOUBLE-PIPE PIPE COUPLING

BACKGROUND OF THE INVENTION

1. Field of the Invention

The present invention relates to a double-pipe pipe coupling and, more particularly, an improvement of the pipe coupling intended to completely shut out outside air.

2. Description of the Related Art

The pipe coupling has been used for the heat medium circulating piping of the air conditioner, for example, but in the case of the pipe coupling of this kind, outside air must not enter into the pipe coupling in order to enhance the rate of heat exchange achieved by coolant. The pipe coupling has therefore the so-called airtight construction to prevent outside air from coming into it by some means.

However, the conventional pipe coupling had the airtight construction but it was not of double-pipe construction. It was therefore needed that the pipe coupling of one kind was used for the piping through which coolant was fed and that the pipe coupling of another kind for the piping through which coolant was returned. This needed wide piping space, caused the cost to become high and made it impossible to provide the piping at low cost.

SUMMARY OF THE INVENTION

An object of the present invention is therefore to provide a double-pipe pipe coupling having simple airtight construction.

This object of the present invention can be achieved by a double-pipe pipe coupling comprising: a socket including a socket main cylinder having a front end portion on which taper holes are formed, locking balls housed in the taper holes and a sleeve on the outer periphery of the front end portion of the socket main cylinder; a plug including a plug main cylinder on which an annular groove is formed, the plug being connected with said socket in such a way that the locking balls are seated on the annular groove of the plug main cylinder by means of the sliding movement of the sleeve; wherein the socket has a cylindrical slide ring and a collar cylinder arranged coaxial to each other, and first and second passages defined by the slide ring and the collar cylinder; the slide ring includes a stop means for stopping the sliding of the slide ring in the axial direction of the socket main cylinder at a certain position and locking the movement of the sleeve when the slide ring advances to the front side of the socket and a valve means having a slide valve arranged inside the slide ring and a valve body arranged inside the collar cylinder and serving to seal the front end of the plug when the plug is connected into the socket and independently close the first and the second passage by means of the slide valve and the valve body when the plug is not connected into the socket; the plug includes a plug main cylinder, a partition means formed integral with the plug-main cylinder and located at a position which corresponds to the front end of the collar cylinder of the socket, first and second passages which are partitioned by the partition means, a first slide valve arranged in the first passage and pushed by the collar cylinder of the socket to open the first passage when the socket and the plug are connected to each other, a valve stem arranged in the second passage to open the valve body which opens and closes the second passage in the socket when the plug is connected into the socket, and a second slide valve arranged in the second passage and pushed by the collar cylinder of the socket to separate from the valve stem when the plug is connected into the socket.

According to the double-pipe pipe coupling of the present invention, the locking balls arranged on the side of the socket are seated on the annular groove arranged on the side of the plug by the sleeve to connect the plug into the socket.

The slide valve of the socket is, although delicately, contacted this time with the end face of the plug main cylinder, the collar cylinder of the socket with the slide valves of the plug for closing the first and the second passage and the valve body of the socket with the valve stem of the plug to prevent outside air from entering into the pipe coupling.

When the slide ring is moved to the front side of the socket, the collar cylinder formed integral with the slide ring is also moved to the front side of the socket. When the collar cylinder advances and enters into the plug through the front opening thereof, the first and the second valve of the plug for closing the first and the second passage are pushed against compression springs. The first and the second passage in the plug are made open this time while the first and the second passage in the socket are also made open. The first passages are communicated with each other while the second passage are also communicated with each other under the state that their sealings are complete. This prevents outside air from entering into the both passages and keeps the inside of the pipe coupling airtight.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1A and 1B are side views, partly sectioned, showing an example of the double-pipe pipe coupling according to the present invention in which FIG. 1A shows a socket and FIG. 1B shows a plug;

FIGS. 4A and 4B show an arrangement of the slide ring in the socket in which FIG. 4A is a front view and FIG. 4B is a side view partly sectioned.

DETAILED DESCRIPTION OF THE PREFERRED EMBODIMENTS

Figures 1A, 1B:
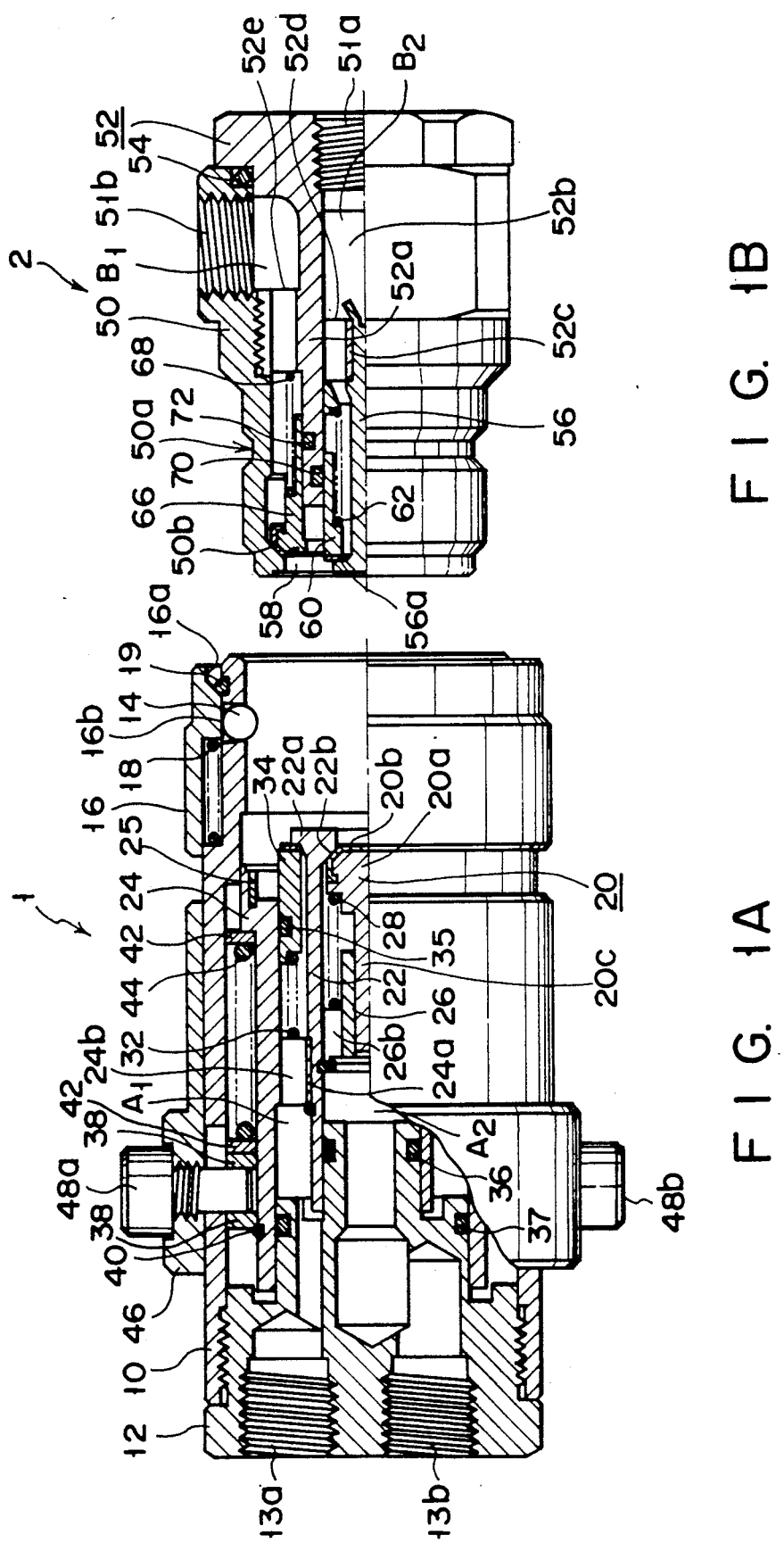

FIGS. 1A and 1B are side views, vertically sectioned, showing the main portion of an example of the double-pipe pipe coupling, in which FIG. 1A shows a socket (or female coupling section) 1 and FIG. 1B a plug (or male coupling section) 2 arranged on the side of the air conditioner. It will be described at first what arrangement the socket 1 has.

In FIG. 1A, a socket adapter 12 is screw-connected to the rear end of a main cylinder 10 of the socket 1 and the socket adapter 12 is provided with female screw sections 13a and 13b for screw-connecting pipings, through which two kinds of fluids, different in pressure, pass to the socket main cylinder 10. The front end portion of the socket main cylinder 10 is provided with plural taper holes on a same circumference and a locking ball 14 is loosely seated in each of the taper holes with its part capable of projecting from the inner and outer circumferences of the socket main cylinder 10. A sleeve 16, urged toward the front side of the socket main cylinder 10 by a compression spring 18 and slidable in the axial direction of the cylinder 10, is fitted onto that area of the cylinder 10 where the locking balls 14 are arranged, and stopped from coming out of the front end of the cylinder 10 by a stop ring 19. When the sleeve 16 is slid against the compression spring 18 and the locking balls 14 are located corresponding to a free space 16a formed on the front inner circumference of the sleeve 16, the locking balls 14 are made movable in the free space 16a. Therefore, a main cylinder 50 of the plug which will be described later can be inserted into the socket main cylinder 10 under this state. On letting go of the sleeve 16, it returns to its original position to again push the locking balls 14 into their taper holes. The locking balls 14 are thus projected from the inner circumference of the socket main cylinder 10 to seat on a circumferential groove 50a on the plug main cylinder 50.

This example of the double-pipe pipe coupling is designed to open and close valves in two high pressure fluid passages by means of a drive means on the outer circumference of the socket main cylinder 10, and the drive means comprises a lock ring 46 rotatable on the outer circumference of the socket main cylinder 10 and slidable in the axial direction of the cylinder 10, two guide grooves 47 on the socket main cylinder 10 symmetrical relative to the axis of the socket main cylinder 10 and tilted at a prescribed angle, and two bolts 48a and 48b screwed through the lock ring 46 at those positions thereof which are symmetrical relative to the axis of the lock ring 46, fitted into rings 38 located on a slide ring 24 at predetermined positions thereof, and engaged with the guide grooves 47, respectively. When the lock ring 46 is rotated at a desired angle, the bolts 48a and 48b are guided by the guide grooves 47 to thereby slide the slide ring 24 by a predetermined stroke.

Figure 3:
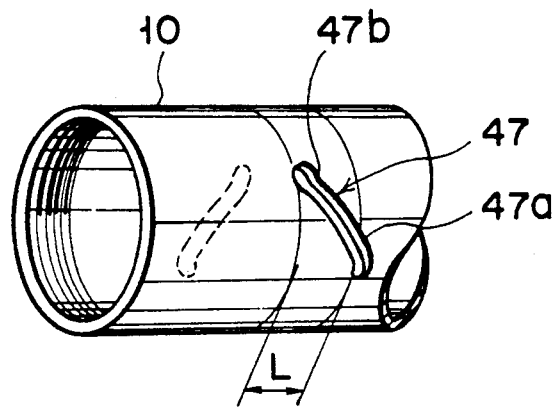
FIG. 3 is a perspective view showing a main cylindrical body of the socket provided with guide grooves.

As shown in FIG. 3, each of the guide grooves 47 of the socket main cylinder 10 includes a guide section 47a wider than the diameter of each of the bolts 48a and 48b and shaped substantially like a spiral, and stopper sections 47b at both ends of the groove 47 to stop the bolt 48a or 48b. When the lock ring 46 is rotated, the bolt 48a is slid along the guide groove to move the slide ring 24 in the axial direction of the cylinder 10 only by a distance L.

The construction of this double-pipe pipe coupling will be described.

The slide ring 24 is located nearest to the inner circumference of the socket main cylinder 10, a collar cylinder 22 is then located inside the slide ring 24 to slide together with the slide ring 24, and a valve body 20 is further located inside and can be slid by a valve pawl 26 fixed to the collar cylinder 22.

A first passage $A_1$ extends between the collar cylinder 22 and the slide ring 24 in the axial direction thereof and a second passage $A_2$ extends inside the collar cylinder 22. The first passage $A_1$ is closed when the front end face of a slide valve 34 urged by a compression spring 32 is contacted with the outer circumference of a flange 22a formed at the front end of the collar cylinder 22 and the second passage $A_2$ is closed when a valve head 20a of a valve body 20 urged by a compression spring 28 is contacted with a valve seat 22b formed on the inner circumference of the front end of the collar cylinder 22.

Figure 4A:
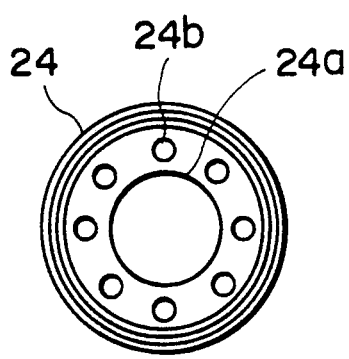
Figure 4B:
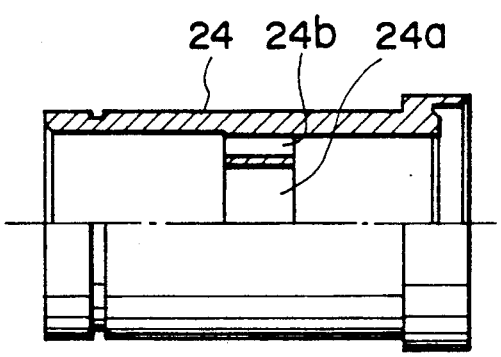

As shown in FIGS. 4A and 4B, the slide ring 24 is a hollow cylinder having a holder 24a for the collar cylinder 22 in the center thereof and eight paths 24b located round the collar cylinder with a certain interval interposed between the adjacent paths 24b. The paths 24b form a section of the first passage $A_1$.

The front end of the slide ring 24 has a larger inner diameter equal to the outer diameter of the front end of the plug main cylinder 50 to allow the latter to fit into the front end of the slide ring 24. A seal ring 25 made of stainless steel and shaped flat rectangular in section is attached to the inner circumference of the larger diameter front end portion of the slide ring 24 to keep air-tightness when the plug 2 is connected to the socket 1.

The rings 38 are attached together with a stop ring 40 to the outer circumference of the slide ring 24 and the rings 38 and the slide ring 24 are urged in reverse directions by a compression spring 44 arranged between flat washers 42 and 42 on the outer circumference of the slide ring 24.

An O-ring 35 is arranged on the outer circumference of the slide valve 34 to keep air-tightness between the valve 34 and the slide ring 24.

A rubber lining 20b is baked onto the whole surface of the valve head 20a of the valve body 20 located inside the collar cylinder 22 and the valve pawl 26 which slidably holds a valve shaft 20c of the valve body 20 is provided with eight paths 26b formed round the valve shaft 20c with a same interval interposed between the adjacent paths 26b to form a section of the second passage $A_2$. As described above, the collar cylinder 22 can slide together with the slide ring 24 in the socket main cylinder 10 and O-rings 36 and 37 are arranged on the socket adapter 12, as shown in FIG. 1, to keep air-tightness between the collar cylinder 22 and the adapter 12 and between the slide ring 24 and the adapter 12.

The plug 2 will be described below.

In FIG. 1B, the groove 50a on which the locking balls 14 are seated is formed on the outer circumference of the plug main cylinder 50 and when the locking balls 14 are seated on the circumferential groove 50a, the plug 50 and the socket main cylinder 10 are connected to each other.

A plug adapter 52 is screw-connected to the rear end of the plug main cylinder 50 and it is provided with a female thread 51a into which a fluid piping is screw-connected. Another female thread 51b into which another fluid piping is screw-connected is formed in the plug main cylinder 50, extending in a direction perpendicular to the direction in which the female thread 51a extends. The plug main cylinder 50 and the plug adapter 52 are metal-sealed by a seal ring 54 made of stainless steel, shaped rhombic in section and located at those end face portions of the cylinder 50 and the adapter 52 which are contacted with each other.

The plug adapted 52 is provided with a cylindrical section (or partition means) 52a having a passage 52b whose diameter is substantially same as the inner diameter of the collar cylinder 22 of the socket 1 and extending into the plug main cylinder 50, and a valve stem 56 is fixed to the axial center portion of the cylindrical section 52a by a cylindrical holder 52c located in the center and inside the cylindrical section 52a in such a way that the axial center line of the valve stem 56 is aligned with that of the valve body 20 of the socket 1. The holder 52c is provided with eight paths 52d round the valve stem 56 with a certain interval interposed between the adjacent paths 52d and these eight paths 52d form a section of a second passage $B_2$. Further, eight paths 52e are formed round the cylindrical section 52a outside the valve stem 56 with a certain interval interposed between the adjacent paths 52e and these paths 52e form a section of a first passage $B_1$.

As apparent from the above, the first passage $B_1$, same in diameter as the first passage $A_1$ in the socket 1 is formed between the inner circumference of the plug main cylinder 50 and the outer circumference of the cylindrical section 52a of the plug adapter 52 and slide valves 60 and 66 are fitted into the outer and inner circumferences of cylindrical section 52a in such a way as sandwiching the cylindrical section 52a in outer and inner circumferential directions.

A reference numeral 58 represents a space located in front of the slide valves 6 and 66 and defined by the front inner circumference of the plug main cylinder 50 and the front outer circumference of the valve stem 56, and when the socket 1 and the plug 2 are connected to each other, the front flange 22a of the collar cylinder 22 on the side of the socket 1 enters into the space 58, contacting its front end face with those of the slide valves 60 and 66, so that the first $B_1$ and the second passage $B_2$ can be completely shut at the front inside of the plug 2.

A reference numeral 68 represents a compression spring for pressing the first passage closing slide valve 66 against a valve seat 50b on the front inner circumference of the plug main cylinder 50 and a reference numeral 62 denotes a compression spring for pressing the second passage closing slide valve 60 against a valve seat 56a on the front outer circumference of the valve stem 56.

O-rings 70 and 72 are arranged on those portions of the slide valves 60, 66 and the cylindrical section 52a of the plug adapter 52 which are contacted with one another to keep air-tightness between them. Rubber linings are baked onto the fronts of the slide valves 60 and 66 to make their valve function excellent.

Figure 2:
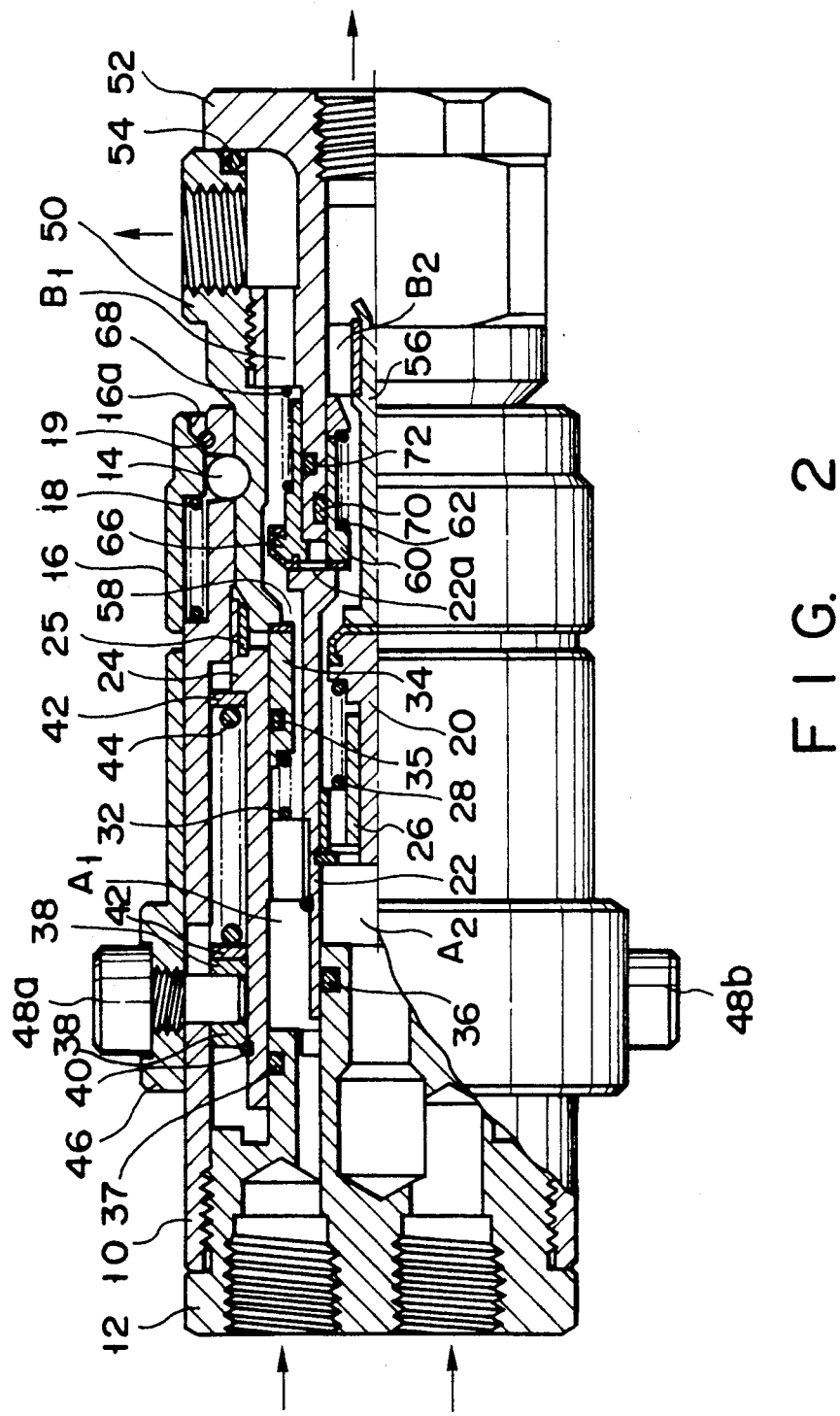
FIG. 2 is a side view, partly sectioned, showing the socket and the plug coupled.

Referring to FIG. 2, it will be described how the socket and the plug are connected to each other.

When the plug 2 is to be connected to the socket 1, the sleeve 16 at the front end portion of the socket 1 is retreated against the compression spring 18 and the locking balls 14 are made movable in the free space 16a inside the inner circumference of the sleeve 16. When the plug main cylinder 50 is inserted into the socket main cylinder 10 under this state and, the sleeve 16 is then released, therefore, the locking balls 14 are pressed into the annular groove 50a on the outer circumference of the plug main cylinder 5 by the inner circumference 16b of the sleeve 16. The slide valve 34 is contacted this time with the plug main cylinder 50 at their front end faces, the front flange 22a of the collar cylinder 22 with the slide valves 60, 66 at their front end faces, and the valve body 20 with the valve stem 56 at their front end faces, respectively.

When the lock ring 46 is rotated right, seeing FIG. 2 from the left direction, the bolts 48a and 48b whose front ends are engaged with the slide ring 24 are guided along the guide grooves 47 of the socket main cylinder 10. FIG. 2 shows the lock ring 46 turned until the bolt 48a reaches the stopper section 47b of the guide grooves 47.

When the slide ring 24 advances in this manner, the seal ring 25 on the inner circumference of the slide ring 24 tightly seals the front outer circumference of the plug main cylinder 50 on the one hand, while the slide valve 34 on the front inner circumference of the slide ring 24 tightly seals the front end face of the plug main cylinder 50 at the front end face thereof on the other hand, under the state that the slide valve 34 is separated from the collar cylinder 22.

When the slide ring 24 further slides, the collar cylinder 22 and the valve pawl 26 supported together with the slide ring 24 move toward the plug 2. The collar cylinder 22 thus retreats the slide valves 60 and 66 in the plug main cylinder 50 against the compression springs 62 and 68 on the one hand, while the valve body 20 on the side of the socket 1 is retreated against the compression spring 28 by the valve stem 56 in the plug 2 on the other hand, so that the first passage $A_1$ and the second passage $A_2$ in the socket 1 can be completely communicated with the first passage $B_1$ and the second passage $B_2$ in the plug 2.

When the first and the second passages in the socket 1 are communicated with those in the plug 2, the front flange 22a of the collar cylinder 22 closely contacts and tightly seals the slide valves 60 and 66, as described above. The both passages thus communicated are completely sealed from outside.

Further, when the first and the second passage in the socket 1 are to be communicated with those in the plug 2, the lock ring 46 rotates and advances (in the right direction in FIG. 2). The rear end face of the sleeve 1 which is operated at the time of connecting the plug 2 into the socket 1 is contacted with the front end face of the lock ring 46 and when the bolts 48a and 48b guided by the guide grooves 47 reach the stopper sections 47b shown in FIG. 3, the plug 2 is completely locked into the socket 1.

It will be now described how the plug 2 is detached from the socket 1.

The process of separating the plug 2 from the socket 1 is started from loosening the lock ring 46. When the lock ring 46 is reversely turned to loosen the engagement of the bolts 48a and 48b with the guide grooves 47, the first passages $A_1$, $B_1$ and the second passages $A_2$, $B_2$ are closed, respectively, and the sealings are also released between the plug 2 and the socket 1. Namely, the plug 2 and the socket 1 close the first and the second passages by their own valve systems 60, 66 and 20, 34 to thereby prevent fluids from leaking outside. When the sleeve 16 is then operated, the plug 2 can be easily detached from the socket 1.

Although the slide ring 24 has been slid in the axial direction thereof by turning the lock ring 46 in the case of the above-described example, the present invention is not limited to this example. The slide ring 24 may be slid in the axial direction thereof by an eccentric cam which is rotated by a lever.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A double-pipe pipe coupling comprising:
    a socket including a socket main cylinder having a front end portion on which taper holes are formed, locking balls housed in the taper holes and a sleeve on the outer periphery of the front end portion of the socket main cylinder;
    a plug including a plug main cylinder on which an annular groove is formed,
    said plug being connected with said socket in such a way that the locking balls are seated on the annular groove of the plug main cylinder by means of the sliding movement of the sleeve; wherein
    said socket has a cylindrical slide ring and a collar cylinder arranged coaxial to each other, and first and second passages defined by the slide ring and the collar cylinder;
    said slide ring includes a stop means for stopping the sliding of the slide ring in the axial direction of the socket main cylinder at a certain position and locking the movement of the sleeve when the slide ring advance, and a valve means having a slide valve arranged inside the slide ring and a valve body arranged inside the collar cylinder and serving to seal the front end of the plug when the plug is connected into the socket and independently close the first and the second passage by means of the slide valve and the valve body when the plug is not connected into the socket;
    said plug includes a plug main cylinder, a partition means formed fixed to the plug main cylinder and located at a position which corresponds to the collar cylinder of the socket, first and second passages and which are partitioned by the partition means, a first slide valve arranged in the first passage and pushed by the collar cylinder of the socket to open the first passage when the socket and the plug are connected to each other, a valve stem arranged in the second passage to open the valve means which opens and closes the second passage in the socket when the plug is connected into the socket, and a second slide valve arranged in the second passage and pushed by the collar cylinder of the socket to separate from the valve seat of the valve stem when the plug is connected into the socket.

2. The double-pipe pipe coupling according to claim 1, wherein said lock means includes guide grooves formed in the socket main cylinder, a lock ring slidably fitted onto the socket main cylinder, and bolts fixed to the lock ring, extended toward the center of the socket, passing through the guide grooves, and stopped by the outer surface of the collar cylinder.

3. The double-pipe pipe coupling according to claim 1, further comprising springs for urging said valve body, slide valve and first and second slide valves.

4. The double-pipe pipe coupling according to claim 3, wherein said collar cylinder includes a front flange having a valve seat against which the valve body and the slide valve are struck.

5. The double-pipe pipe coupling according to claim 3, wherein said plug main cylinder has a valve seat against which the first slide valve is struck and said valve stem has a valve seat against which the second slide valve is struck.

6. The double-pipe pipe coupling according to claim 1, wherein rubber linings are baked onto valve heads of the valve body, slide valve and first and second slide valves.

* * * * *